(12) United States Patent
Zimniewicz et al.

(10) Patent No.: US 7,418,700 B2
(45) Date of Patent: Aug. 26, 2008

(54) SYSTEM AND METHOD TO FACILITATE INSTALLATION AND/OR REMOVAL OF COMPONENTS

(75) Inventors: Jeff A. Zimniewicz, Bellevue, WA (US); Gary P. Raden, Bellevue, WA (US); Ryan M. Helgeson, Snohomish, WA (US); William M. Nelson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 871 days.

(21) Appl. No.: 09/771,761

(22) Filed: Jan. 29, 2001

(65) Prior Publication Data

US 2002/0103973 A1 Aug. 1, 2002

(51) Int. Cl.
*G06F 9/445* (2006.01)
(52) U.S. Cl. .................. 717/175; 717/169; 717/170
(58) Field of Classification Search .......... 717/169, 717/170, 174, 175, 176
See application file for complete search history.

(56) References Cited

U.S. PATENT DOCUMENTS 5,721,824 A * 2/1998 Taylor ..................... 717/175
5,845,128 A * 12/1998 Noble et al. ............. 717/170
6,367,075 B1 * 4/2002 Kruger et al. ............ 717/169
6,381,742 B2 * 4/2002 Forbes et al. ............ 717/176
6,442,754 B1 * 8/2002 Curtis .................... 717/175
6,820,259 B1 * 11/2004 Kawamata et al. ...... 717/173

OTHER PUBLICATIONS

Weston, R.; "Model-Driven, Component-Based Approach to Reconfiguring Manufacturing Software Systems", *International Journal of Operations & Production Management*, vol. 19, No. 8, 1999, p. 834-855.
Poulin, J.S., et al.; "A Reuse-Based Software Architecture for Management Information Systems", *Proceedings from the Fourth International Conference on Software Reuse*, 1996, p. 94-103.

* cited by examiner

*Primary Examiner*—Michael J Yigdall
(74) *Attorney, Agent, or Firm*—Amin, Turocy & Calvin, LLP

(57) ABSTRACT

The present invention provides a system and method to facilitate installation and/or removal of components in which one of the components is a shared component. The components are installed based on a valid order, such that shared components are installed after other components have been installed. According to one aspect, one or more properties associated with a shared component may be manipulated to facilitate installation and/or removal of components, including the shared component and dependent components.

23 Claims, 8 Drawing Sheets

SYSTEM AND METHOD TO FACILITATE INSTALLATION AND/OR REMOVAL OF COMPONENTS

TECHNICAL FIELD

The present invention relates to computer programming and, more particularly, the present invention relates to a system and method to facilitate installation and/or removal of components.

BACKGROUND OF THE INVENTION

Software applications and/or services are commonly offered to consumers in the form of grouped packages or suites, in which two or more such applications are provided. A suite is generally provided at a lower cost than if the individual applications included therein were purchased separately. In addition, a software suite typically includes an assortment of related and/or interoperable applications or services targeted to satisfy the software needs of a particular type of customer, such as small businesses or other types of organizations. Different application suites may thus be provided to satisfy various market needs, where certain segments of software consumers commonly require more than one application or service.

It is common to install the various applications of a suite onto one or more computers. However, if the applications are not installed in a proper sequence and with a proper dependency for the installed components, there is an increased likelihood of errors occurring during installation. When an error occurs, the user typically must exit the current installation, correct the error identified, and reinitiate the installation procedure. This dilemma is particularly pertinent for shared components.

For example, one or more applications of a suite may depend on one or more shared components or applications. A shared component typically is not operable unless utilized in conjunction with the application or applications that depend upon it. That is, the shared component usually serves no useful purpose by itself.

By way of illustration, an indexing service provides an efficient way to search through a large data store. The indexing service is configured specifically for each application with which it is installed to operate. As a result of such configuration, the indexing service is programmed to know how and/or what to search in the data store in conjunction with its associated application. In the absence of the associated dependent application to search, the indexing service provides substantially no useful purpose. Those skilled in the art will appreciate other instances in which shared components are employed.

In certain circumstances one or more versions of a shared component could be provided in a suite of applications. In the absence of a logical way to manage such data, more than one version of a shared component could be installed on a given machine. Moreover, the multiple versions of the same component may be stored in an unorganized manner, which could result in conflicts or other errors associated with the operation or use of such components.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method to help manage installation and/or removal of components, in which at least one of the components is a shared component. A shared component is a component (or application) that is used by one or more other components and that serves substantially no useful purpose by itself.

A system in accordance with an aspect of the present invention includes a validation engine operable to provide a valid order for components identified for installation. A setup engine receives information indicative of a suggested installation order, such as may be in the form of a list of components having a predetermined installation order. Each component that is a shared component has associated metadata that identifies the component as a shared component. The valid installation order for the components, which may be the same or different from the received list, ensures that each shared component is installed subsequent to non-shared components.

The setup engine further controls installation of the components according to the valid order provided by the validation engine. The installer effects installation of each component, which may include loading files and manipulating properties associated with each component. In accordance with a particular aspect, the installer is operable to manipulate properties associated with each shared component to reflect dependency relationships with one or more other components. The setup engine also may be operable to modify a reference count property associated with each shared component to indicate how many installed components depend on each respective shared component.

In accordance with another aspect, the installer also may be operable to facilitate removal of one or more installed components. For example, the installer is operable to determine whether a component selected for removal from a machine is dependent upon a shared component. If the selected component is dependent upon a shared component, the installer may manipulate the properties associated with the shared component (or components) to reflect the removal of the dependent component, which may include removing associated configuration data and adjusting the reference count property accordingly.

According to another aspect of the present invention, the present invention provides a method to facilitate installation and/or removal of components. The method includes providing a valid order. The order, for example, may be substituted for a predetermined order, such as in situations when one or more shared components have been slated for installation prior to non-shared components. Each identified component is installed according to the valid order. The installation, for example, includes loading files and, for shared components, manipulating properties associated with each shared component. The properties associated with a given shared component characterize dependency relationships for the shared component relative to one or more other components that depend on the shared component.

One or more additional installation processes may be employed in connection with each shared component that is used by more than one other component. The additional installation process includes manipulating the properties of the shared component to reflect additional dependency characteristics for that the shared component. For example, configuration data associated with the shared component may be adjusted to identify each additional component that depends on the shared component. An additional installation process may be repeated for each shared component until properties associated with the shared component reflect each component that may use the shared component.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention provides a system and method to facilitate installation and/or removal of components in which one of the components is a shared component. A shared component, as used herein, refers to a component having a run time dependency. That is, the shared component serves no useful purpose in the absence of one or more other components that depend on the shared component. The present invention further facilitates smooth installation of components by helping ensure that shared components are installed after other components are installed.

Figure 1:
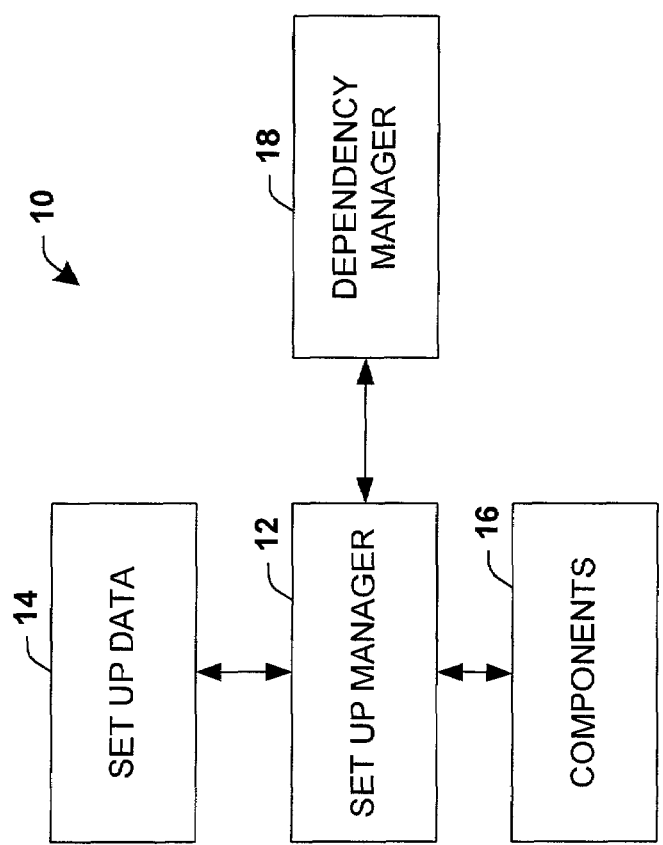
FIG. 1 is a block diagram illustrating a system in accordance with the present invention.

FIG. 1 illustrates a system 10 operative to facilitate installation and/or removal of components in accordance with an aspect of the present invention. The system 10 includes a core setup manager 12. The setup manager 12 is programmed and/or configured to control installation and/or removal of components based on dependency characteristics of such components.

By way of example, at install, the setup manager 12 accesses setup data 14, such as may contain one or more files indicative of a predetermined installation order for the components that are to be installed. A developer or creator of the software components being installed may define (or designate) the installation order. In addition, several installation orders may be defined for different aspects of the overall installation process, each of which order being associated with a different part of the process.

The setup manager 12 also may access a data structure (e.g., a list) 16 identifying available components. The data structure 16 also may include metadata associated with shared components to identify them as shared components. Metadata may identify various characteristics of each of the available components. For example, the metadata may include a single bit flag condition, which may be set to identify whether a component is a shared component. The metadata further may identify other dependency characteristics or other information useful for installation of the components.

The system 10 further includes a dependency manager 18 programmed and/or configured to validate the order(s) provided by the setup data 14. The dependency manager internal data based on which it determines whether an order is valid. For example, algorithms may be employed examine each component, discern dependency characteristics thereof, and identify the order as valid or invalid accordingly. In accordance with an aspect of the present invention, a valid order ensures that shared components are installed after their associated dependent components. An invalid order, for example, may provide for installing shared components prior to other components, including their dependent components. If the order from the setup data 14 is invalid, the dependency manager 18 creates a valid order. The dependency manager 18 returns the valid order to the setup manager 12, which may be a created order or the order from the setup data 14. The setup manager 12, in turn, calls an installation method that employs the returned valid order during an associated installation process. The valid order controls the installation of the components.

For example, an order usually will be valid if all shared components are installed after all non-shared components. In this way, during installation of a shared component, the shared component can appropriately configure itself for operation with its dependent component(s) that have already been installed.

In accordance with an aspect of the present invention, the method utilized by the setup manager 12 installs the components based on the valid order. The installation process may be run in two parts. A first part relates to a mainline installation procedure in which each component is installed in the valid order. The mainline installation includes a typical installation, which may include copying files, creating registry entries, registering DLLs, expanding directory schemas, creating a directory structure. For each shared component installed in the mainline installation, reference count data also is initialized. In addition, the component may configure properties to one of the dependent components to enable use of the shared component by the corresponding dependent component.

The second part of the installation relates to a shared installation procedure in which shared components having more than one dependent component are installed for each respective dependent component. The shared installation procedure is run for each shared component based on the number dependent components for the shared component. Because each shared component has already been installed once during the mainline installation, the shared installation of each shared component for each additional associated dependent component may be abbreviated. The abbreviated installation, for example, includes incrementing a reference count value and configuring properties of the shared component based on the dependent component for which it is being installed. Thus, the reference count is incremented an additional time for each dependent component for which the shared component is installed.

The setup manager 12 also is operative to facilitate removal of components in accordance with an aspect of the present invention, such as where a user selects to remove a dependent component. Because shared components typically have no useful purpose in the absence of one or more dependent components, a user typically will not seek to remove a shared component. When a dependent component is removed, the setup manager 12 causes the shared component to decrement its reference count and remove its configuration data for that dependent component. The shared component should not remove its files, however, unless the reference count indicates that the last remaining dependent component is being removed.

In view of the foregoing, it will be appreciated that the system 10 facilitates installation of shared components, such that a single version of a shared component is installed. Consequently, configuration errors that could arise because more than one component is dependent on a common shared component are mitigated. In addition, the system 10 helps ensure that the latest version of a shared component is installed at the end of the set process.

Figure 2:
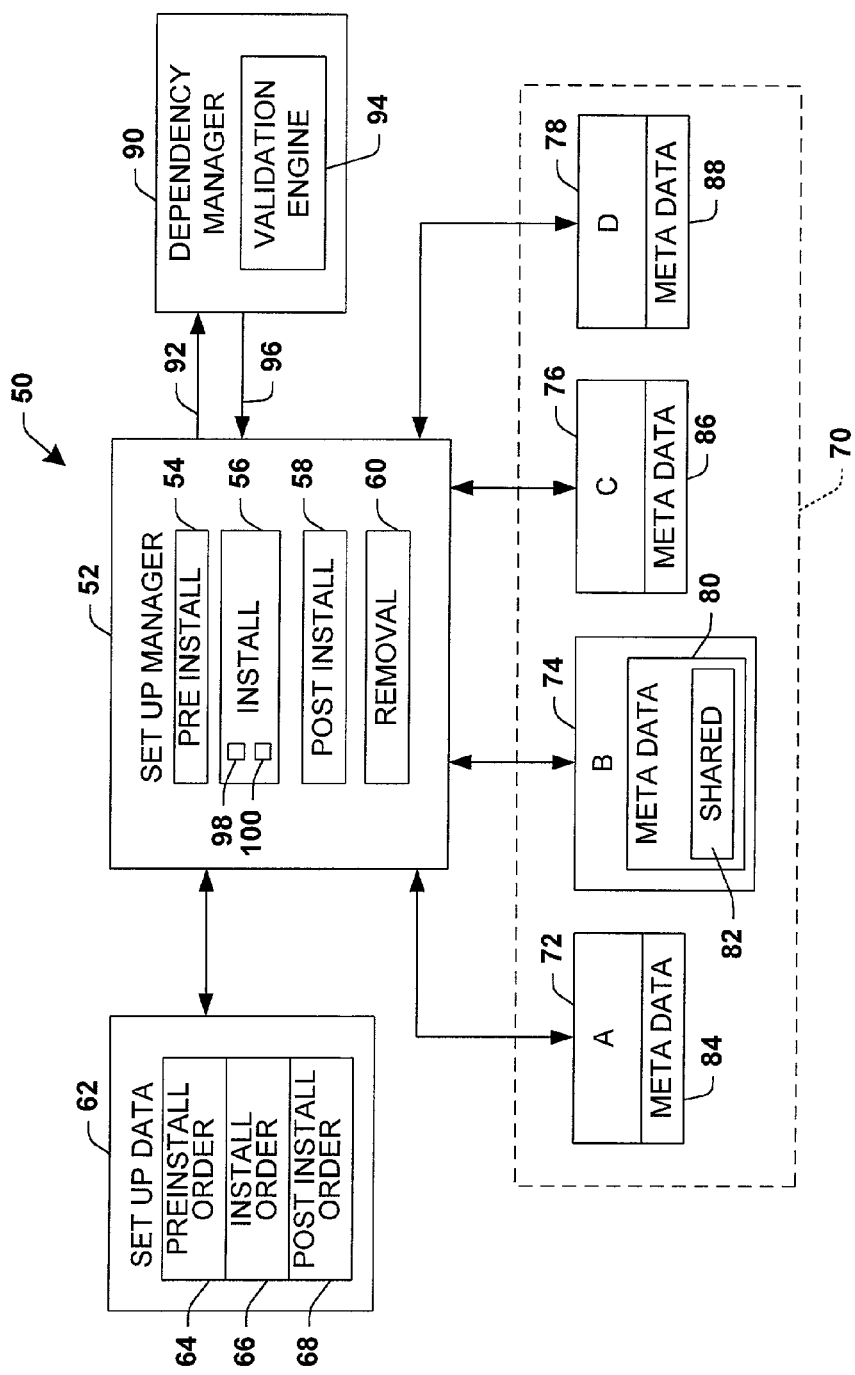
FIG. 2 is a functional block diagram illustration a system in accordance with the present invention.

FIG. 2 illustrates a functional block diagram of a system 50 operative to facilitate installation and/or removal of components in accordance with an aspect of the present invention. The system 50 includes a core setup manager 52. The setup manager 52 is programmed and/or configured to control installation and/or removal of components based on dependency characteristics of such components. In order to add or remove components, the setup manager 52 has one or more associated methods 54, 56, 58, and 60. The methods 54, 56, 58, and 60 may be called as part of an installation or removal procedure.

In this example, the methods pertaining to installation of components are illustrated as a preinstall method 54, an install method 56, and a post install method 58. The preinstall method 54, for example, occurs prior to installing components onto a destination system (e.g., one or more computers). The preinstall method 56 ascertains whether circumstances exist at the destination system so as to enable proper installation of all selected components onto the destination. The install method 56 implements actual installation of the components onto the system in accordance with an aspect of the present invention. The installation, for example, may include, copying files, creating registry entries, registering DLLs, expanding directory schemas, creating a directory file structure, etc. The developer or creator of the software being installed may set the particulars associated with the installation.

During the setup procedure, the setup manager 52 employs setup data 62 to determine how components are to be installed or removed. The setup data 62 includes data intended to control setup procedures relating to components being installed. In this example, the setup data 62 includes a preinstall order 64, an install order 66, and a post install order 68. Each of the order data 64, 66, 68 provides a predetermined order for implementing each of the respective installation methods 54, 56, 58, respectively.

A developer or creator of the software being installed may define (or designate) the orders associated with the setup data 62. However, because different software products may be packaged in a suite or multiple suites that include common shared components, the order designated by the creator could result in configuration problems if utilized.

The setup manager 52 also may access a data structure (e.g., a list) 70 identifying components A, B, C, and D, indicated respectively at 72, 74, 76, and 78, which are available for installation. While, for purposes of brevity, four components 72, 74, 76, and 78 illustrated in FIG. 2, those skilled in the art will understand and appreciate that any number (greater or lesser from that shown) may be installed with a system or methodology in accordance with an aspect of the present invention.

In this particular example, the component B (74) is a shared component. As mentioned above, a shared component is a component having runtime dependency on one or more other components. That is, a shared component serves no substantially practical purpose in the absence of at least one component (a dependent component) that depends on the shared component. For example, the components 72 and 78 may be dependent components that depend on the shared component 74. While a single shared component 74 is illustrated in the example of FIG. 2, those skilled in the art will understand and appreciate that any number of shared components could be implemented as a part of a system or methodology in accordance with the present invention.

The shared component 74, which is being installed, includes associated metadata 80 to provide information relevant to its installation. For example, the metadata 80 may include data 82 that identifies the component as a shared component. For example, the shared data 82 may be implemented as simple as a single bit flag condition, which may be set to an ON or OFF condition to identify whether a component is a shared component. The metadata further may include configuration information that identifies dependency relationships between the shared component one or more of the other components 72, 76, 78. The other components 72, 76, and 78 also may include metadata 84, 86, and 88, respectively for providing information (e.g., configuration data) useful in their respective installation.

The system 50 further includes a dependency manager 90 programmed to provide a valid order, such as may be utilized during setup by corresponding methods 54, 56, 58 of the setup manager 52. The setup manager 52 provides the dependency manager 90 an order, indicated at 92, for installing components 72-78. The order 92 may correspond to the setup data 64, 66, 68 for each respective part of the setup. The dependency manager 90 includes a validation engine 94 programmed to validate the order 92 as provided by the setup manager 52. The validation engine 94 is programmed to determine whether a particular order is valid. For example, the validation engine 94 may employ algorithms to examine each component 72, 74, 76, 78 (e.g., including metadata), discern dependency characteristics thereof, and identify the order as valid or invalid based on its evaluation.

In accordance with an aspect of the present invention, a valid order ensures that shared components are installed after their associated dependent components. An invalid order, for example, has shared components marked for installation prior to other components, including associated dependent components. Thus, an order usually will be valid if all shared components are installed subsequent to all non-shared components. Because the dependent component(s) are installed prior to the shared components that they may depend upon, when the shared component is installed, it can appropriately configure itself to each of its associated dependent components.

If the order from the setup manager 52 (as provided in the setup data 62) is invalid, the dependency manager 90 creates a valid order, such as according to the guidelines just described. The dependency manager 90 returns the valid order 96 to the setup manager 52. Accordingly, the valid order 96 may be created by the dependency manager 90 or it may be the same as the order 92 from the setup manager 52. It is to be appreciated that different orders may be utilized by different methods called by the setup manager 52 for different parts of the setup process. In accordance with an aspect of the present invention, the setup manager 52, may call a corresponding method 54, 56, or 58 that implements a corresponding part of an installation setup procedure based on the returned valid order 96.

By way of illustration, the install method 56 may be implemented as two parts, namely a primary install function (or method) 98 and a shared install function (or method) 98. The primary install function 98 is a mainline installation procedure in which each component 72-78 is installed consecutively in the valid order 96 returned by the dependency manager 90. The primary install function 98, for example, follows a typical installation procedure, which may include copying files, creating registry entries, registering DLLs, expanding directory schemas, creating a directory structure.

Figure 3:
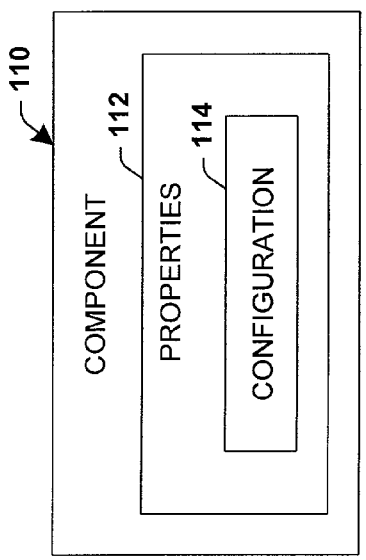
FIG. 3 is a simplified representation of a component that may be utilized in accordance with the present invention.

FIG. 3 illustrates an example of an installed component 110. The component 110 includes associated properties 112 that characterize operational properties of the installed component 110. The properties 112 further include configuration data 114, such as may include the registry entries, DLLs needed for operation, directory data, etc.

Referring back to FIG. 2, for each shared component 74 installed as part of the primary install function 98, reference count data of the shared component is initialized. That is, in addition to the typical aspects of installation, the first time a shared component 74 is installed, reference count data associated with the shared component is initialized to a starting value. As mentioned above, the reference count provides information indicative of how many dependent components depend on the respective shared component, such as may be employed to facilitate removal of the shared component. During its first installation, the setup manager 52 also may cause the shared component 52 to configure its properties according to one of the dependent components to enable use of the shared component by the corresponding dependent component. For example, the primary install function 98 may cause the shared component 74 to configure to its associated dependent component (e.g., dependent component 72) that was installed first according to the valid order 96.

Figure 4:
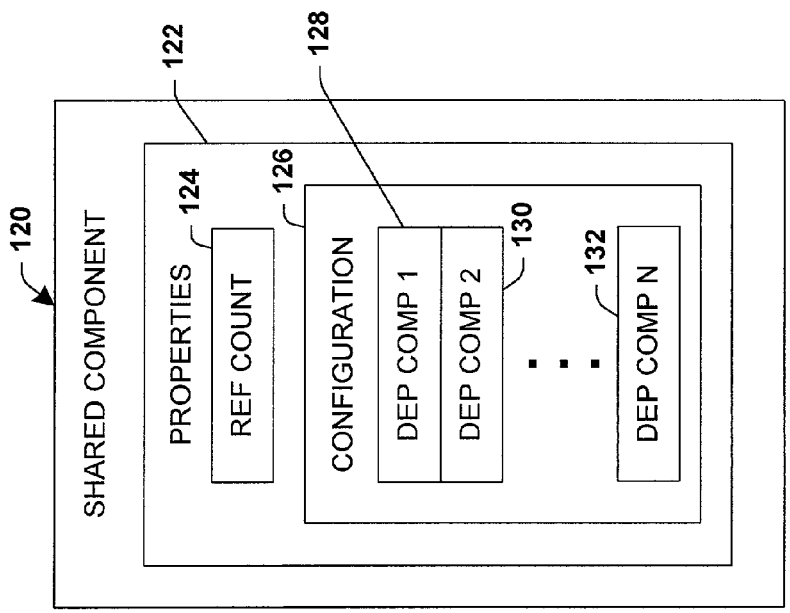
FIG. 4 is a simplified representation of a shared component that may be utilized in accordance with the present invention.

FIG. 4 illustrates an example of an installed shared component 120, such as the shared component 74 of FIG. 2. The shared component 120 includes files and has associated properties 122 that characterize dependency relationships and configuration information useful for running the shared component. In particular, the properties 122 include a reference count 124 that identifies the number of dependent components for which the shared component 120 has been installed to operate. Other configuration data 126 also is associated with the shared component 120. For example, the setup manager 52 (FIG. 2) may cause the shared component 120 to set configuration data 128 for a first dependent component for which it is installed by the primary install function 98. By way of example, the properties 122 could be stored in one or more registries associated with the shared component 120, with the reference count and configuration data being implemented as subkeys thereof. Those skilled in the art will understand and appreciate other arrangements that could be employed to store the associated properties of shared components, all of which are contemplated as being within the scope of the present invention.

Referring back to FIG. 2, the run shared install function 100 is called to control subsequent installation of each shared component. For example, the shared install function 100 is called multiple times for each shared component, such that each shared component is installed once for each of its dependent components. Because each shared component has already been installed once by the primary install function 98, the operation performed by the shared install function 100 may be abbreviated for each additional dependent component, provided that a version of the shared component being installed is at least the same version as that being installed. This helps ensure that files for a most recent or updated version of the shared component are installed at the end of the setup procedure.

For example, assume that components 72 and 78 depend on the shared component 74. When the shared install function runs, each of the components 72, 78 has already been installed once by the primary install function 98. In addition, the shared component 74 has been installed once completely by the primary install function 98. The primary install function 98 also causes the shared component to be configured for operation with one of its dependent components 72 or 78, such as the component 72 that was installed first (e.g., according the install order 96). The shared install function 100, in turn, performs an abbreviated installation of the shared component 74 for the remaining dependent component 78, which includes incrementing its reference count and configuring properties to enable operation with the installed version of the component 78.

By way of further illustration if the system 50 is employed to initiate a subsequent setup procedure, such as to install another suite of components or a new version of one or more installed components, which includes a more updated version of a shared component that has already been installed, the updated shared component may be installed to replace its older version. This presumes appropriate backwards compatibility of the updated version with the previously installed dependent components. The newly installed version further may utilize and build on the existing properties of the previously installed shared component, including the reference count and dependency-related configuration data. As a result the system 50 helps to ensure that a single and most updated version of a shared component is installed.

Referring to FIG. 4, the abbreviated installation may include incrementing the value of the reference count 124 and configuring the component 120 based on the dependent component for which it is being installed. The shared component 120 may set configuration data 130 through 132 during each additional install iteration by the shared install function 100 (FIG. 2) for the shared component so as to configure the shared component for each associated dependent component. Thus, the reference count 124 is incremented for each dependent component for which the shared component 120 is installed.

With reference back to FIG. 2, the setup manager 52 also is operative to facilitate removal of components in accordance with an aspect of the present invention, such as where a user selects to remove a dependent component. Because shared components typically have no useful purpose in the absence of one or more dependent components, a user typically will not seek to remove a shared component. When a dependent component is removed, the setup manager causes the shared component to decrement its reference count 124 (FIG. 4) and remove its configuration data for that dependent component. The shared component does not remove its files, however, unless the reference count indicates that a sole remaining dependent component is being removed.

Figure 5:
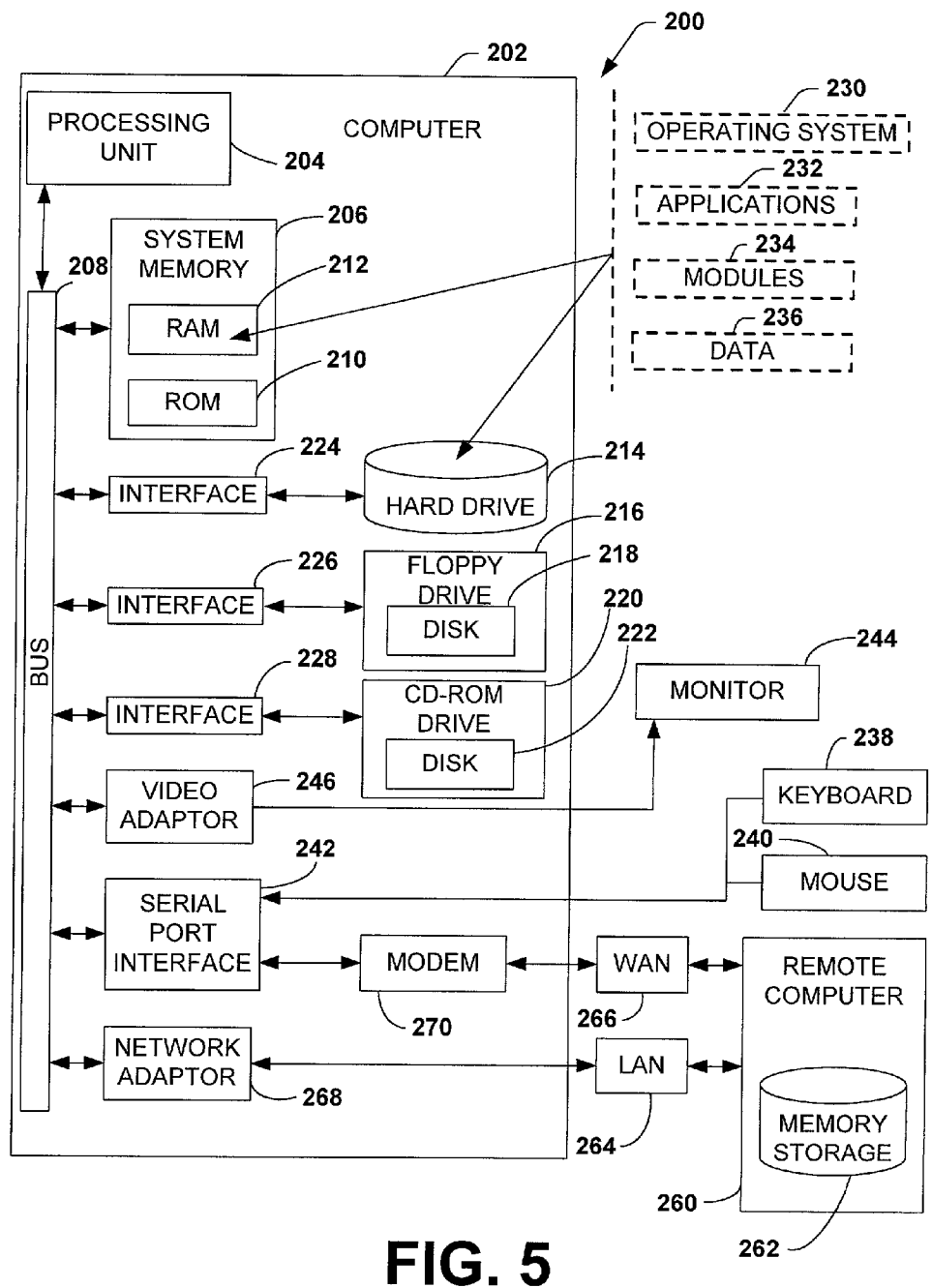
FIG. 5 is an example of an operating environment for a system implemented in accordance with the present invention.

In order to provide additional context for the various aspects of the present invention, FIG. 5 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may have one or more subcomponents.

With reference to FIG. 5, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any commercially available or proprietary processor. In addition, the processing unit may be implemented as multiprocessor formed of more than one processor, such as may be connected in parallel.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system 200 memory includes read only memory (ROM) 210 and random access memory (RAM) 212. A basic input/output system (BIOS), containing the basic routines that help to transfer information between elements within the computer 202, such as during start-up, is stored in ROM 210.

The computer 202 also may include, for example, a hard disk drive 214, a magnetic disk drive 216, e.g., to read from or write to a removable disk 218, and an optical disk drive 220, e.g., for reading from or writing to a CD-ROM disk 222 or other optical media. The hard disk drive 214, magnetic disk drive 216, and optical disk drive 220 are connected to the system bus 208 by hard disk drive interface 224, a magnetic disk drive interface 226, and an optical drive interface 228, respectively. The drives and their associated computer-readable media provide nonvolatile storage of data, data structures, computer-executable instructions, etc. for the computer 202. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention and or may contain components that are to be installed in accordance with an aspect of the present invention.

A number of program modules may be stored in the drives and RAM 212, including an operating system 230, one or more application programs 232, other program modules 234, and program data 236. The operating system 230 may be any suitable operating system or combination of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor 244, the computer 202 may include other peripheral output devices (not shown), such as speakers, printers, etc.

The computer 202 may operate in a networked environment using logical connections to one or more remote computers 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 5. The logical connections depicted in FIG. 4 may include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 270, or is connected to a communications server on the LAN, or has other means for establishing communications over the WAN 266, such as the Internet. The modem 270, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

In view of the foregoing structural and functional features described above, methodologies in accordance with various aspects of the present invention will be better appreciated with reference to FIGS. 6, 7, 8, and 9. While, for purposes of simplicity of explanation, the methodologies of FIGS. 6, 7, 8, and 9 shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodologies may be implemented as computer-executable instructions, such as software stored in a computer-readable medium. Alternatively, the methodologies may be implemented as hardware or a combination of hardware and software.

Figure 6:
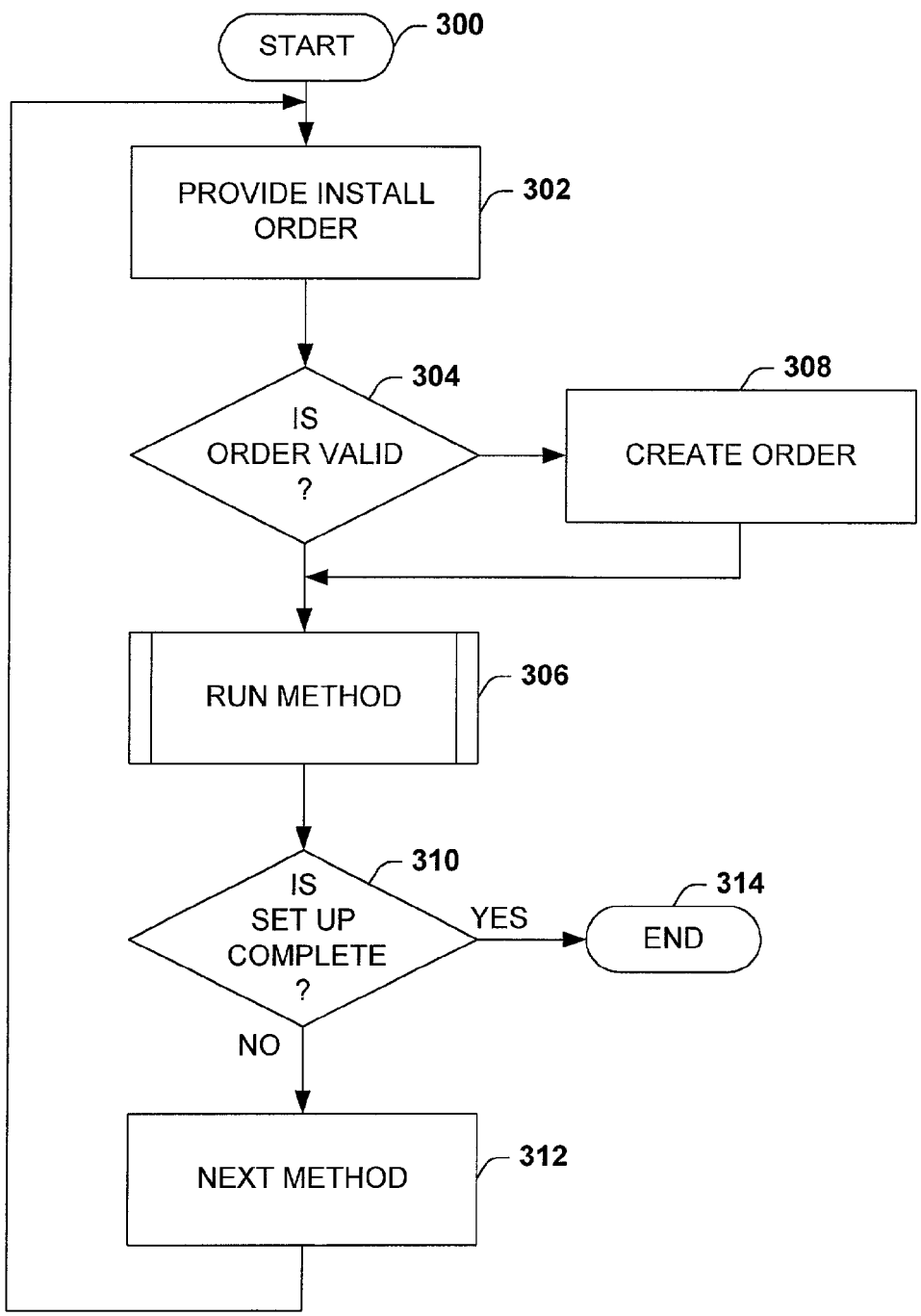
FIG. 6 is a flow diagram illustrating an installation methodology in accordance with the present invention.

FIG. 6 illustrates an installation setup methodology in accordance with an aspect of the present invention. The methodology is operable to install a plurality of components, such as may be embodied in one or more suites. A suite, for example, includes a plurality of components, at least one of which is a shared component. A shared component has run time dependency with one or more other components. That is, a shared component provides no substantially useful purpose in the absence of at least one dependent component.

The methodology begins at 300 in which the setup is initiated, such as may coincide with inserting a CD into an appropriate reading device. Those skilled in the art will understand and appreciate that the setup methodology could be initiated through other mechanisms. Next, at 302 an install order is provided. The install order, for example, may be pre-determined by a developer or other creator of the suite of software being installed.

At 304, a determination is made as to whether the install order is valid. If the install order is valid, the methodology proceeds to 306 in which a corresponding method of the setup procedure is run, such as by calling the method to run based on the valid order. By way of illustration, the setup procedure may include one or more methods associated with installation and/or removal of components. If the determination back at 304 is negative, indicating an invalid order, the methodology proceeds to 308. At 308, a valid order is created. The valid order, for example, identifies a valid order in which the components may be installed. The valid order ensures that shared components are installed after installation of each dependent component. From 308, the methodology proceeds to 306 in which a corresponding method is run.

As set forth herein, for example, the methods may include a pre-install method, an install method and a post install method. The pre-install method includes housekeeping tasks necessary to ensure that the system is properly prepared for installation of the components. The install method, which is described below in connection with FIGS. 7 and 8, handles installation of each component including shared components. A post install method may be employed for cleanup activities as well as for providing additional information associated with the components that have been installed. After the method at 306, a determination is made at 310 as to whether the setup is complete. If the setup is not complete, the setup procedure advances at 312 to a next method associated therewith. That is, the methodology returns to 302 in which the foregoing functionality may be repeated. If the determination at 310 is affirmative, indicating that the setup installation ends at 314.

Figure 7:
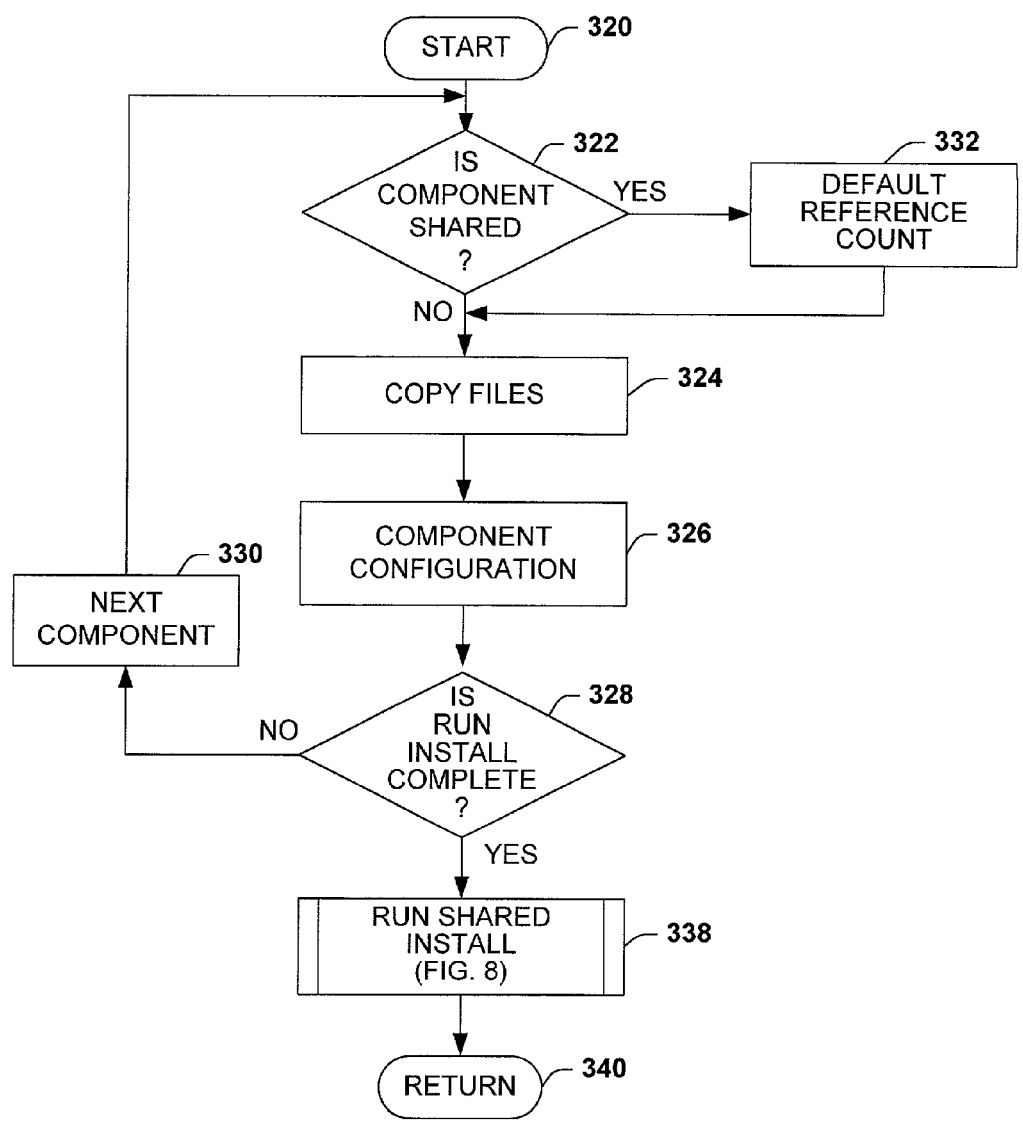
FIG. 7 is a flow diagram illustrating part of an installation methodology in accordance with the present invention.

FIG. 7 illustrates a first part of an install method implemented in accordance with an aspect of the present invention. The install methodology begins at 320, such as in response to a call by a setup manager (e.g., 12 or 52 in FIGS. 1 and 2, respectively). The first part corresponds to a run install, which generally may be implemented as a typical component installation according to the valid order, which may be created or obtained based on stored data associated with the install method. For example, at 322 a determination is made as to whether the component being installed is a shared component. If the component is not a shared component, the methodology proceeds to 324. At 324, files for the first component in the install order are copied. Next, at 326, the component being installed is configured for operation on the system (or systems) to which it is being installed. The configuration may include, for example, creating registry entries, registering DLLs, starting services, creating directory structures, and extending a schema for directory services.

At 328, a determination is made as to whether the run install is complete. That is, have all components in the specified valid order been installed. If this determination is negative, the methodology proceeds to 330 in which a next component is accessed for installation. From 330, the methodology returns to 322 in which the foregoing steps are repeated.

If the determination at 322 is affirmative, indicating that the component being installed is a shared component, the methodology proceeds to 332. At 332, a reference count is initialized or set to its default condition. For example, the reference count may have a value that is initialized to one, which indicates the number of dependent components for which a shared component is installed. From 332, the methodology proceeds to 324 in which associated files are copied. Then at 326, the shared component is configured, such as by setting properties, including configuration data, to correspond to a previously installed dependent component. For example, during an initial installation of a shared component, the shared component may configure itself according to the configuration information associated with a dependent component that was installed first according to the installation order. From 326, the methodology proceeds to 328. Other configuration characteristics also are set during this part (326) of the run install method.

If the determination at 322 is affirmative, indicating that the run install is complete, the methodology proceeds to 334 in which a second part of the install process is initiated, which corresponds to a run shared install process. After 334 in which the run shared install has been implemented for each component (or at least the shared components), the methodology proceeds to 336 in which the methodology returns to the process that called the install methodology. Alternatively, the methodology of FIG. 7 could end after the run install method has completed (at 328), with the run shared method being called separately by the setup manager or another appropriate process.

Figure 8:
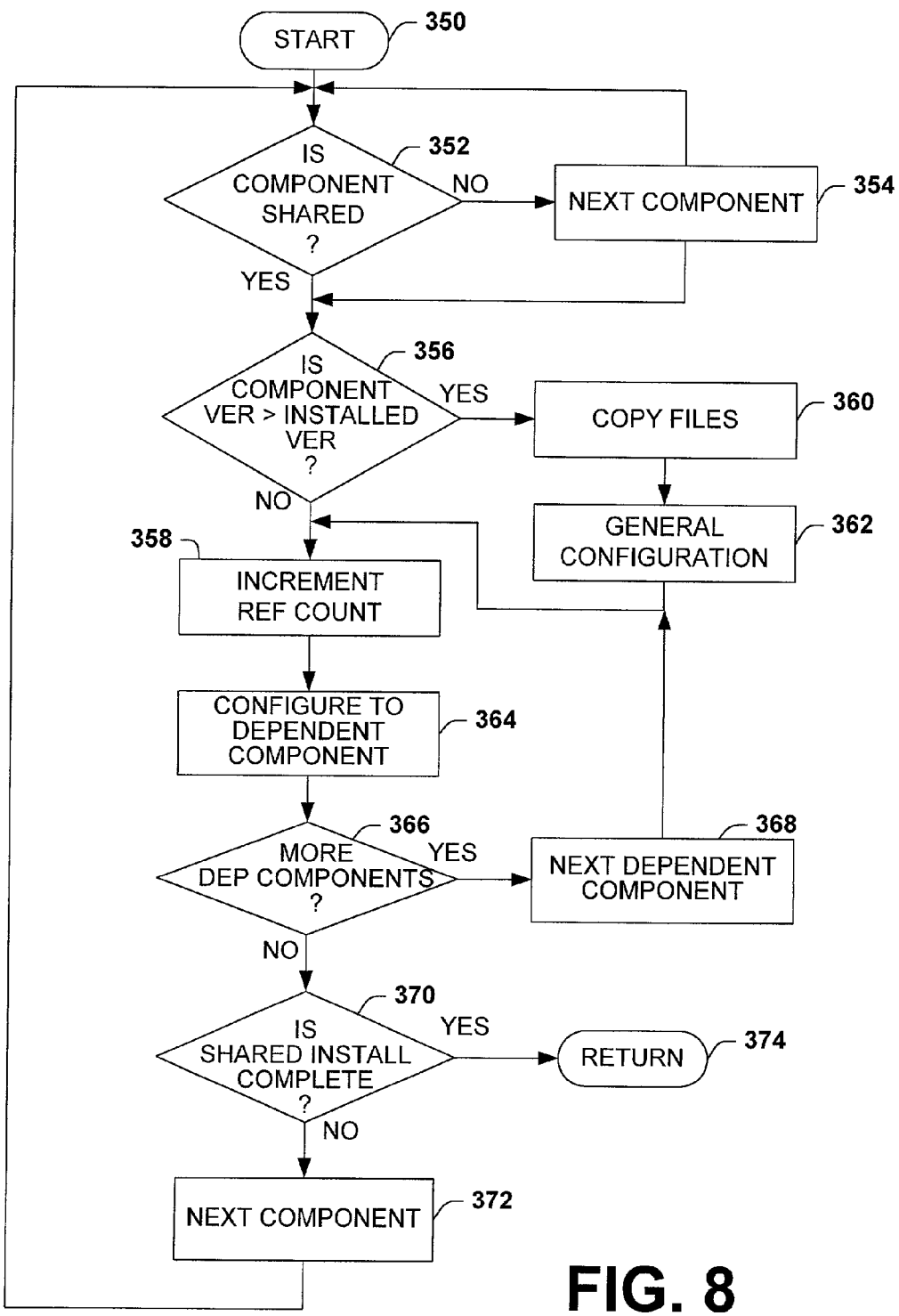
FIG. 8 flow diagram illustrating another part of an installation methodology in accordance with the present invention.

FIG. 8 illustrates an example of a run shared install methodology in accordance with an aspect of the present invention. The methodology begins at 350, such as in response to being called by the setup manager, which typically occurs after a run install methodology has been performed on the components being installed. The shared install methodology, for example, occurs based on the predetermined valid order, such that it is implemented for each component identified in the valid order. At 352, a determination is made as to whether the component is a shared component. This determination, for example, may be made upon analyzing or evaluating metadata associated with each component. If the determination at 352 is negative, the methodology may proceed to 354 in which the next component based on the valid order is obtained for performing the run install methodology. If there are no shared components, for example, the methodology may simply end or, alternatively, this methodology could be skipped altogether during setup. If the determination at 352 is affirmative, indicating that the component is a shared component, the methodology proceeds to 356. At 356, a determination is made as to whether the shared component being installed is an updated version of a previously installed shared component. If the determination is negative, the methodology proceeds to 358 in which a reference count for the shared component being installed is incremented.

If the determination at 356 is affirmative, indicating that the component being installed is a more recent or updated version of a shared component, the methodology proceeds to 360. At 360, a typical installation is performed for the updated shared component being installed, such that the updated version may replace the older version. For example, this may occur in a situation where a first suite of components has been installed that includes at least one shared component and a subsequent suite is later installed, but includes an updated version of one or more of the shared components that have previously been installed. In such a situation, at 360, the files of the updated version of the shared component are copied so as to replace the existing version. Next, at 362, the shared component sets general configuration information for the shared component, such as described above with respect to FIG. 7. Next, at 358 a reference count for the shared component is incremented. In accordance with an aspect of the present invention, the new updated version may assume the configuration and reference count properties of the previous version of the shared component it is replacing, so as to enable interoperability with other dependent components.

Next, at 364, the shared component is configured according to the configuration and properties associated with the next dependent component that depends on the shared component. The first time through the shared install methodology, for example, the shared component is configured to the second component that was installed based on the valid order, as the shared component was previously configured according to the first installed component during the run install methodology of FIG. 7.

Next, at 366, a determination is made as to whether there are additional dependent components for this shared component. If the determination is affirmative, the methodology returns to proceeds to 368 in which configuration information of the next shared component is gathered. From 368, the methodology returns to 358 in which the reference count is incremented and then to 364 in which the shared component is configured for the next dependent component. The loop 358, 364, 368 may continue to configure the shared component for each additional dependent component. If the determination at 366 is negative, the methodology proceeds to 370.

At 370, a determination is made as to whether the shared install methodology is complete. If it is not complete, the methodology proceeds to 372 in which the next component is accessed for implementation with the run shared install methodology. If the shared install is complete, the methodology proceeds to 374 in which the methodology ends and returns to the method or procedure that called the shared install methodology. As mentioned above for example, the shared install method could be implemented as a second part of an installation (e.g., after the run install methodology of FIG. 7), so that the installation may continue accordingly.

While the foregoing installation methods (FIGS. 7 and 8) have been shown and described as occurring as different parts of an overall installation process, it is to be understood and appreciated that, in accordance with an aspect of the present invention, such methods could be implemented as separate methods that are called to perform a desired part of the installation. Those skilled in the art will further appreciate alternative suitable implementations and arrangements that could be employed to install and/or remove components in accordance with the present invention.

Figure 9:
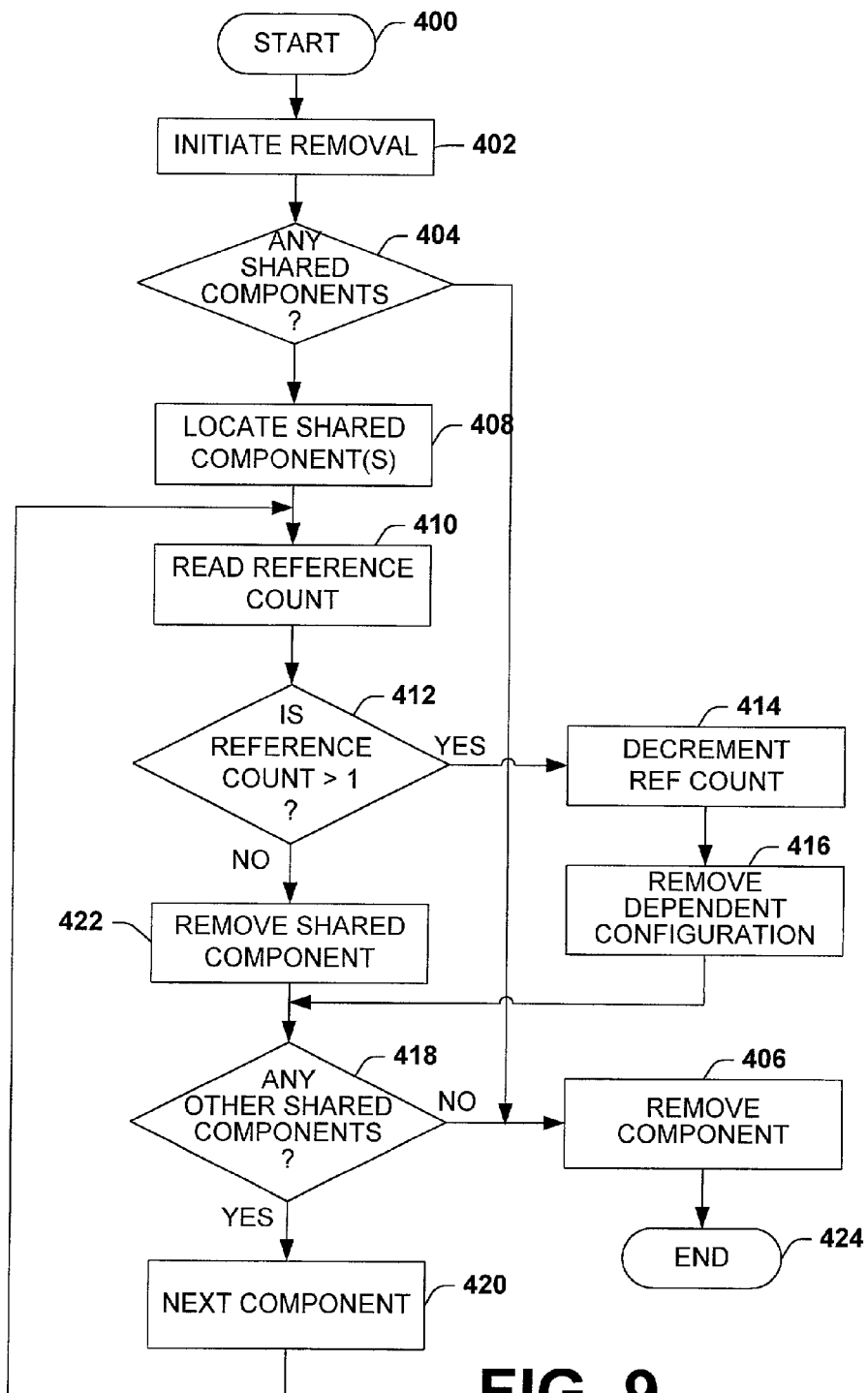
FIG. 9 is a flow diagram illustrating a removal methodology in accordance with the present invention.

FIG. 9 illustrates a methodology for removing a component in accordance with an aspect of the present invention. The methodology begins at 400 in which a removal method or function is called such as by a setup manager or other associated process. Next, at 402, the removal is initiated for one or more selected previously installed components, such may form part of a previously installed suite. As described herein, a component may include a plurality of subcomponents and be associated with one or more shared components. At 404, a determination is made as to whether any shared components are associated with the component being removed. If the determination is negative, the methodology may proceed to 406, in which the component (including subcomponents thereof) are removed from the system. If the determination is affirmative, the methodology proceeds to 408.

At 408, one or more shared components are located for the dependent component being removed. At 410, a reference count associated with a shared component is read. Next, at 412, a determination as to whether the reference count is greater than one, or otherwise indicates that the shared component is configured for operation with only one dependent component (e.g., the component selected for removal). If the determination is negative, the methodology proceeds to 414 in which the reference count is decremented. Next, at 416, the dependent configuration data of the shared component is removed, such as from the registry of the shared component.

At 418, a determination is made as to whether the component being removed depends on any other shared components. If there are additional shared components, the methodology proceeds to 420 in which the next shared component is accessed. From 420, the methodology returns to 410 in which the foregoing functionality is repeated. If the determination at 412 is negative, indicating that the reference count is equal to one, the methodology proceeds to 422 in which the shared component is removed. Removal of the shared component, for example, includes removing and deleting the properties associated with the shared component including all registry values. From 422, the methodology proceeds to 418 to determine whether the component being removed depends on any other shared components. If the determination is negative, the methodology proceeds to 406 in which the dependent component and its associated configuration data are removed. From 406, the methodology ends at 424.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system embodied on a computer readable medium, the system facilitates installation and/or removal of components that includes at least one shared component, the system comprising:
   a validation engine that provides a valid order, the order referentially consistent relative to each of the components; and
   an installer that controls at least one of an install and removal operation of the components based on the valid order, the installer manipulates at least one property associated with the at least one shared component to reflect dependency for the at least one shared component relative to one or more other components that depend on the shared component according to the installation or removal thereof, the at least one shared component automatically subsumes one or more installation properties associated with previously installed shared components, the at least one property further comprises a reference count having a value indicative of a number of dependent components associated with the at least one shared component, dependency-related configuration data, or combinations thereof;
   wherein at least one shared component being installed and configured for a selected dependent component during a first next of installation and at least one shared component for each dependent component other than the selected component is installed during the second part of the installation, the at least one shared component for each dependent component is at least an abbreviated version of the selected dependent component.

2. The system of claim 1, the valid order identifies shared components for installation subsequent to non-shared components.

3. The system of claim 1, the installer increases the value of the reference count for each installation of the at least one shared component.

4. The system of claim 1, the installer decreases the value of the reference count in response to removal of a dependent component that depends on the at least one shared component.

5. The system of claim 1, the at least one property further comprises configuration data that indicates an operating relationship of the at least one shared component and each installed dependent component associated with the at least one shared component.

6. The system of claim 1, the installer controls installation of the at least one shared component, such that a single set of files for the at least one shared component are copied as part of the installation for use by associated dependent components.

7. The system of claim 6, the at least one shared component has associated metadata that identifies the at least one shared component as a shared component.

8. The system of claim 7, the at least one shared component requires at least one dependent component to perform a substantially useful function.

9. The system of claim 8, a runtime dependency exists between an installed dependent component and the shared component on which the dependent component depends.

10. A system that effectuates installation of components including at least one shared component, comprising:
    a processor comprising:
      a setup manager that controls installation of the components;
      dependency manager that provides a valid installation order based on metadata associated with at least some of the components, the valid installation order generated to ensure that relative dependencies between the components are resolved prior to installation;
      the setup manager causes the components to be installed according to the valid installation order during a first part of the installation, a separate shared installation of the at least one shared component being implemented for each dependent component that depends on the at least one shared component during a second part of the installation, the separate shared installation is at least an abbreviated version of the at least one shared component, the separate shared installation comprises incrementing a reference count value indicative of a number of dependent components associated with the at least one shared component, and configuring properties of the at least one shared component, which preserves properties associated with previously installed shared components.

11. The system of claim 10, the dependency manager validates a received installation order, which, upon validation of the received installation order, becomes the valid installation order.

12. The system of claim 11, when the received installation order is improper, the dependency manager creates the valid installation order.

13. The system of claim 10, metadata associated with the at least one shared component identifies the at least one shared component as a shared component.

14. The system of claim 10, further comprising at least one property associated with an installed instance of the at least one shared component that reflects dependency for the at least one shared component.

15. The system of claim 10, the setup manager controls the value of the reference count as a function of each installation and removal of the at least one shared component.

16. The system of claim 10, the at least one property further comprises configuration data that indicates an operating relationship of the at least one shared component and each dependent component associated with the shared component.

17. The system of claim 10, the setup manager controls installation of the at least one shared component based on the valid installation order, such that a single set of program files for the shared component is copied as part of the installation.

18. A system embodied on a computer readable medium that facilitates installation and/or removal of components including at least one shared component, the system comprising:
    a validation component that receives a list of components to be installed and/or removed and provides a valid order based on setup data, the validation component resolves all relative inter-component conflicts prior to installation and/or removal of components, the list of components to be installed and/or removed organized in an invalid order; and
    a setup engine that initiates installation of each of the components according to the valid order during a first part of the installation, the shared component being installed for a first dependent component during the first part of installation, at least an abbreviated version of the shared component being installed for each other dependent component during a second part of the installation separate from the first part, the second part of the installation comprising incrementing a reference count value indicative of a number of dependent components associated with the at least one shared component, and configuring properties of the shared component, which automatically retains a property associated with a previously installed shared component.

19. A system that facilitates installation and/or removal of components including at least one shared component, comprising:
a computer readable medium having stored thereon:
a dependency manager that receives a list of components to be installed and/or removed and provides a valid order based on setup data, the dependency manager resolves all relative inter-component conflicts prior to installation and/or removal of the components, the list of components to be installed and/or removed organized in a random order;
a setup engine that initiates installation of each of the components according to the valid order during a first part of the installation, the shared component being installed for a first dependent component during the first part of installation, at least an abbreviated version of the shared component being installed for each other dependent component during a second part of the installation, which is subsequent to the first part, a reference count value is maintained corresponding to a number of dependent components associated with the at least one shared component; the shared component being installed for the first dependent component acquires properties associated with a shared component previously installed and associated with the first dependent component, and
a setup manager that manipulates at least one property associated with the at least one shared component to reflect dependency characteristics of the at least one shared component as a function of at least one of installation of the shared component and removal of a dependent component that depends on the at least one shared component.

20. A system that effectuates installation and/or removal of components including at least one shared component, comprising:
a computer readable medium having stored thereon:
means for providing a valid order for the components, the valid order referentially consistent relative to each of the components;
means for controlling installation of the components during a first part and a second part based on the valid order, a shared component is installed for a first dependent component during the first part and at least an abbreviated version of the shared component for each other dependent component is installed during the second part; and
means for manipulating at least one property associated with the at least one shared component to reflect dependency for the at least one shared component relative to one or more dependent components that depend on the shared component based on at least one installation of the shared component and removal of a dependent component, prior to replacement of a currently installed shared component with the at least one shared component, the at least one shared component automatically acquires previously affixed installation properties associated with the currently installed shared component, the at least one property further comprises a dependency-related configuration data, a reference count value that indicates of a number of dependent components, or combinations thereof.

21. A method for installing and/or removing components including at least one shared component, the method comprising:
providing a valid order that is consistent relative to each of the components;
installing each of the plurality of components based on the valid order, a shared component being installed for a first dependent component during a first part of the installation and at least an abbreviated version of the shared component for each other dependent component that depends on the shared component being installed during a second part of the installation, which is separate from the first part;
incrementing a reference count value indicative of each of the plurality of components associated with the at least one shared component; and
modifying at least one property associated with the at least one shared component to reflect dependency characteristics of the at least one shared component relative dependent components that utilize the at least one shared component the at least one shared component acquires existing installation properties of shared components that the at least one shared component supersedes on installation, the installation properties including a reference count having a value indicative of a number of dependent components associated with the at least one shared component, dependency-related configuration data, or combinations thereof.

22. The method of claim 21, further comprising controlling the value of the reference count in response to each installation of the at least one shared component and removal of a dependent component that depends on the at least one shared component.

23. A method to facilitate installing and/or removing components including at least one shared component, the method comprising:
providing a valid order referentially consistent relative to each of the installed and/or removed components;
effecting installation of each of the components during a first part of installation according to the valid order, the shared component being installed for a first dependent component during the first part of the installation;
effecting installation of at least an abbreviated version of the shared component for each other dependent component during a second part of the installation separate from the first part, the shared component acquires one or more extant properties associated with a shared component made obsolete and removed by installation of the shared component; and
manipulating at least one property associated with the at least one shared component to reflect dependency for the at least one shared component relative to at least one dependent component according to the installation or removal thereof.

* * * * *

UNITED STATES PATENT AND TRADEMARK OFFICE
CERTIFICATE OF CORRECTION

| | | |
|---|---|---|
| PATENT NO. | : 7,418,700 B2 | Page 1 of 1 |
| APPLICATION NO. | : 09/771761 | |
| DATED | : August 26, 2008 | |
| INVENTOR(S) | : Jeff A. Zimniewicz et al. | |

It is certified that error appears in the above-identified patent and that said Letters Patent is hereby corrected as shown below:

In column 3, line 33, after "FIG. 8" insert -- is a --.

In column 4, line 13, after "manager" insert -- 18 has --.

In column 6, line 1, after "78" insert -- are --.

In column 9, line 58, after "208 by" insert -- a --.

In column 15, line 26, in Claim 1, delete "next" and insert -- part --, therefor.

In column 18, line 25, in Claim 21, delete "component the" and insert -- component, the --, therefor.

Signed and Sealed this

Third Day of May, 2011

David J. Kappos
*Director of the United States Patent and Trademark Office*